Figure 1:
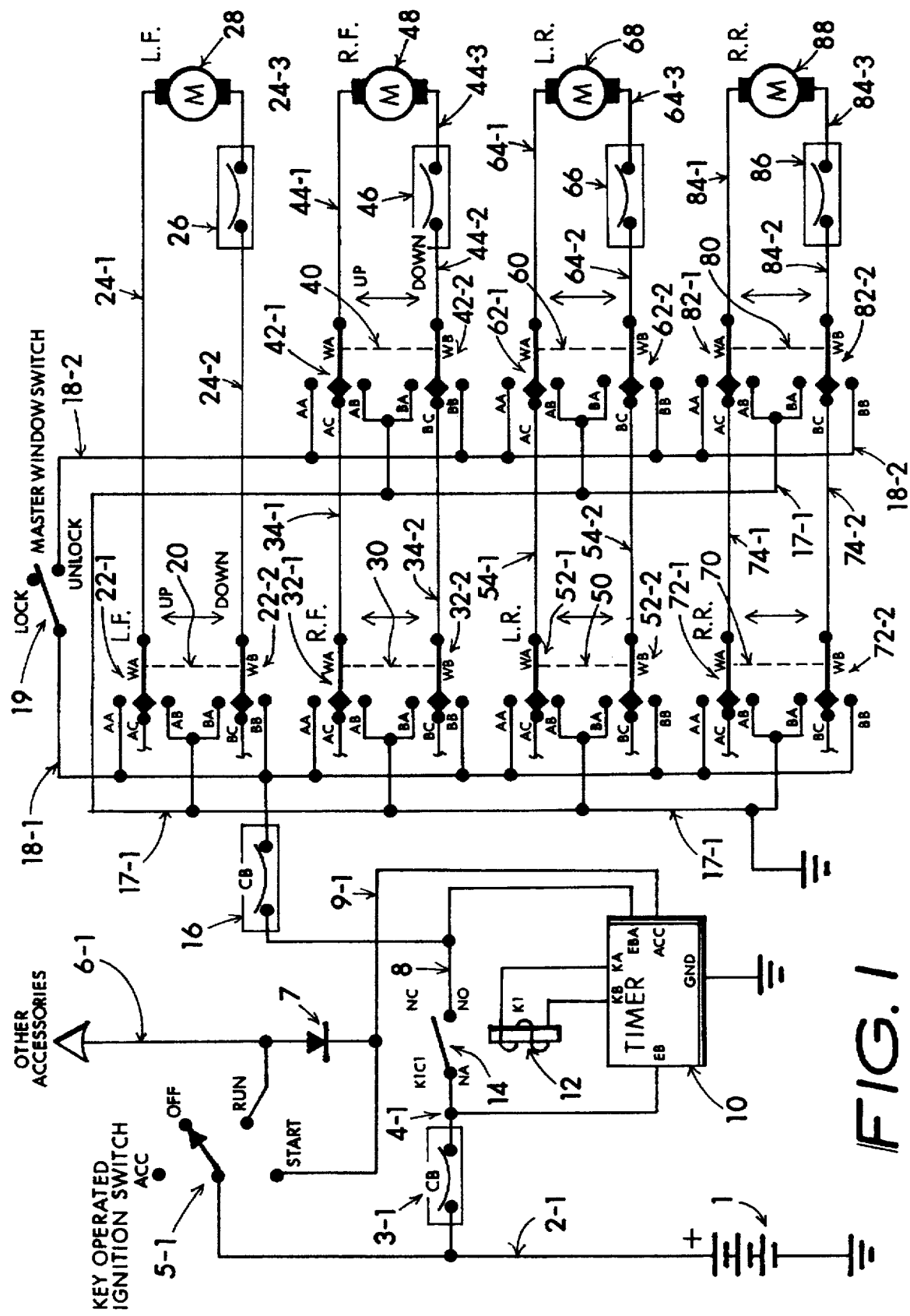

United States Patent [19]
Weber

[11] Patent Number: 5,698,907
[45] Date of Patent: Dec. 16, 1997

[54] MOTOR VEHICLE ELECTRIC WINDOW CONTROL AND CLOSURE OVERRIDE METHOD AND APPARATUS

[76] Inventor: Harold J. Weber, 560 Washington St., P.O. Box 6161, Holliston, Mass. 01746-6161

[21] Appl. No.: 378,584

[22] Filed: Jan. 26, 1995

[51] Int. Cl.$^6$ .................................................. H02P 7/68
[52] U.S. Cl. .................................................. 307/10.1
[58] Field of Search ........................ 307/9.1–10.6; 70/237, 256, 257, 262, 271, 277, 278, DIG. 30, 269; 292/DIG. 3, 341.16, DIG. 25, 201; 318/282–286, 466–470, 483; 49/25, 31, 349; 180/271, 287, 289; 340/825.69, 825.72, 542, 825.32; 454/75

[56] References Cited

U.S. PATENT DOCUMENTS

| | | | |
|---|---|---|---|
| 4,427,929 | 1/1984 | Clerc et al. | 180/289 |
| 4,733,145 | 3/1988 | Ohashi et al. | 307/10.1 |
| 4,864,153 | 9/1989 | McIntosh, Jr. | 307/10.1 |
| 5,079,538 | 1/1992 | DeFino et al. | 307/10.2 |
| 5,129,192 | 7/1992 | Hannush | 49/349 |
| 5,194,756 | 3/1993 | Darbesio | 180/287 |
| 5,381,065 | 1/1995 | Jones | 180/287 |

*Primary Examiner*—Richard T. Elms

[57] ABSTRACT

Motor vehicle electric window regulator antilock control function enabling a motor vehicle operator to belatedly close any vehicle windows inadvertently remaining open subsequent to usual ignition key withdrawal and electrical system lockup of the motor vehicle without necessitating the inconvenient reinsertion of the ignition key to reactivate the electric window regulator system. Post-exit closure of windows may also be provided whereby any inadvertently left-open windows may be closed after the operator has exited from and even locked-up the vehicle. In another setting in a vehicle using electric door locks, lock-up is denied if any windows are left open. Still another arrangement brings about automatic window roll-up whenever certain acts occur, such as when the ignition key is turned-off, the driver's door is opened, or electric locks are set to lock the vehicle.

20 Claims, 11 Drawing Sheets

MOTOR VEHICLE ELECTRIC WINDOW CONTROL AND CLOSURE OVERRIDE METHOD AND APPARATUS

PRIOR ART STATEMENT

This inventor is not currently cognizant of any previous patents or other prior art particularly relating to the teachings of this invention.

FIELD OF INVENTION

My invention relates to the field of electric window regulator controls as ordinarily utilized in motor vehicles to obtain remote adjustment of any of the motor vehicle's several side windows and, where applicable such as in a station wagon, the motor vehicle's rear window. In particular, my invention further relates to those kinds of electric window regulators utilizing electric motors or similar electrically activated contrivances to adjust the up and down slide action of the side windows under the control of the driver and passengers of the motor vehicle. Furthermore, my invention relates to electric window regulators having operation which may be locked out by the motor vehicle's driver and thereby rendered inoperative for the passenger positions thereby preventing any possibility for the passenger's opening or closing any of the windows of the motor vehicle even prior to ignition shutoff and lockup by the driver. My invention also relates to certain vehicles having electrically operated door locks in addition to the electrically operated window regulators.

BACKGROUND OF INVENTION

Contemporary motor vehicles and in particular passenger automobiles are frequently equipped with electric window regulators which enable convenient operator control of the window positions throughout the motor vehicle by merely pressing a button and without the necessity for manual "crank-up" operation of the regulator. Electric window regulators have been known for a long time and have been employed in numerous domestic and foreign motor vehicle models for decades. Originally, electric window regulator applications were limited primarily for use in luxury class motor vehicles. However, a more contemporaneous trend has been to include electric window regulators in even the most modest of motor vehicles. Electric windows have, in fact, moved from being merely a luxury level convenience item to now being perceived as a fundamental convenience in all but the most primitive motor vehicles.

Electric window regulators are handy, but at the same time they often produce inconvenience and annoyance when a window is unnoticedly "left open" and the operator has taken the key from the ignition switch lockset or even exited from and locked up the motor vehicle's doors and "pocketed" the key. At this point, even if a window is cracked partially open the frustrated operator must decide whether to leave the open window ajar or else to fumble with his set of keys and at least reinsert the ignition key into the ignition keylock in order to temporarily reactivate the usual electric window control system and enable roll-up of the inadvertently left-open window.

A further advantage of electric window regulation is provided by the intrinsic capability for enabling the driver to control selective passenger position lockout of electric window operation. Electric window systems frequently contain a master "lock" switch ordinarily arranged to be convenient solely to the motor vehicle's driver which enables the driver to intentionally secure window operation throughout the motor vehicle and thereby inhibit operation of all passenger position windows. The purpose is to safeguard the position of all of the passenger windows against unwanted operation by persons other than the driver. This is a particularly handy, if not downright vital, safety consideration when young children are conveyed in the motor vehicle. It is this locked out mode of operation of common vehicular windows which frequently leads to inadvertently left-open passenger position windows due to oversight by the driver when hurriedly disembarking from the motor vehicle, for example to attentively assist the passenger from the outside of the motor vehicle. It is not an uncommon situation where the driver of a motor vehicle shuts-off the motor vehicle, takes the keys and locks the driver side door of the motor vehicle thereupon walking to the passenger side of the motor vehicle to helpfully assist the passenger whereupon the driver notices that the passenger window is still at least partially unclosed. Such a scenario might include a young mother who circles to the passenger side of the motor vehicle to fetch her child. A decision at this point is made to either leave the window unshut whereupon security of the motor vehicle against break in or theft is compromised or, conversely, to fumble for the right key and re-enter the key into the motor vehicle's ignition thereby re-enabling the window regulators and allowing full roll-up of any windows which might have been left open.

SUMMARY OF THE INVENTION

Motor vehicles are frequently equipped with electric window regulators that provide easy "pushbutton" controlled operation of window up and down action. In the usual contemporary embodiment, such window regulators ordinarily employ a reversible electric motor together with appropriately geared mechanical drive linkages. In a typical arrangement, each door of the motor vehicle (which utilizes an automatic regulator) is provided with a "rocker" switch which might be depressed by the passenger's finger to initiate either roll up or roll down of the window side glass. In addition, it is usual that the driver of the motor vehicle is provided with a switch cluster including an essentially separate rocker switch for each window of the motor vehicle which is provided with an automatic regulator. The driver's switch cluster may furthermore include a singular lockout or disablement switch which denies operation of any of the motor vehicle's automatic regulators to any passenger although window position operation may remain under the driver's exclusive control.

Automatic window regulators of this type are ordinarily tied into the principal electrical circuits of the motor vehicle which are shutoff or activated by the motor vehicle's key operated ignition switch. This translates into a commonplace situation where a motor vehicle window may be unnoticedly left partially open until the driver prepares for or actually exits from the motor vehicle and well after the driver has withdrawn the ignition key and perhaps already deposited it into his trouser's pocket or her purse. At best, this means fumbling for the key and reinserting it into the ignition to regain control of the window closure system so that the left-open window may be tightly closed or alternatively, to simply leave the window unclosed thereby breaching the motor vehicle's security or weather tightness. Obviously, such delay due to a left-open window and the necessity for fumbling in a purse or pocket for the key may also leave the driver unnecessarily vulnerable to robbery, assault or mugging in a potentially high-crime location, such as might be found in an inner-city parking garage, suburban shopping mall parking lot and many other settings.

In usual motor vehicle application the lockout of operation of the electric window regulators after ignition key withdrawal is a desirable safety feature in that it alleviates the problem of a child or even a pet from being able to operate the window regulator in absence of the driver. Understandably, a child may intentionally roll-down a window when the parent is momentarily away from the motor vehicle. A dog or other pet may also inadvertently step upon the window control switch and lower a window when his master is away from the motor vehicle. Electrical lockout of window regulator operation also prevents a potential "car-thief" from merely lowering a window by forcing a slim stick through the motor vehicle's weatherstripping and depressing the window operator switch.

I have found it advantageous to provide for extended operation of the window regulator system for a short period of time after ignition and electrical system lockup of the motor vehicle. In other words, a time delay is introduced during which the window regulators of the motor vehicle remain operative even after the ignition key is taken from the ignition switch. I have also found that several modes for overcoming the left-open window problem may be useful. Aside from maintaining window regulator operation for a short interval (e.g., say 20 seconds to several minutes) after ignition key removal it might also be desirable to provide supplementary control whereby all left-open windows automatically roll-up when the ignition key is removed. To overcome the situation whereby it is desirable to leave windows intentionally open even when the ignition key is withdrawn (such as when purposefully leaving some ventilation in the motor vehicle in a parking lot or the like, particularly in hot weather or in a tropical climate) it is desirable to provide the automatic roll-up with a defeat mode. This defeat mode may, for example, be conveniently obtained by the expedient action of momentarily turning the ignition keyswitch into the "accessory" position prior to key removal whereby this additional turn-off step is sensed by the automatic window roll-up system and serves to inhibit unwanted roll-up. Of course a separate defeat switch might be alternatively provided.

Once the driver has exited the motor vehicle and locked-up the motor vehicle's doors (particularly in event an electric lock system is utilized) a partially open window may draw notice. In this situation I have conceived additional provision for external window roll-up by the driver. In one form I have provided roll-up of left-open windows through extended utilization of a remote controlled electronic entry device ofttimes provided with contemporary motor vehicles. In this manner, the small remote control sender typically includes a switch arrangement indicated as "lock" and "unlock", the function for which is to obviously lock and unlock the motor vehicles doors. Through the relatively convenient expedient of depressing the "lock" switch for an extended period of time, for example several seconds, the electronic entry system may recognize this as an intentional call to roll-up any left-open windows.

For motor vehicles without the remote entry feature or else as an adjunct to those motor vehicles which do, I have furthermore found that re-insertion of the motor vehicles key into the driver's doorlock might be utilized to operate my window roll-up feature. Operation is obtained, for example, by merely inserting the key into the door lockset for a few seconds, whereafter any left-open windows automatically close. Better yet, I have discovered that automatic window closure is produced when the key is inserted into the door lockset and turned to the "lock" position for several seconds whereafter automatic window closure occurs.

I have also found that, for purposes of simplicity of implementation and utilization it is ordinarily best if automatic closure systems of the kind I now describe operate to merely allow closure of the motor vehicle's windows and not necessarily include the capability for opening. In particular, I have found at least the following operational modes as representative of convenience and safety produced by this invention when used with vehicles of ordinary design and utility:

1. Maintain window regulator operation for a short period of time after ignition lockup.
2. Enable at least window closure from a "keyless entry" remote control device.
3. Automatically roll-up any "left open" windows upon ignition key removal.
4. Turning the door lockset key to the "lock" position for a few seconds produces automatic roll-up of all left-open windows.
5. Driver-side door lock system is disabled for a short time after ignition lockup if window is left part-way open, whereby window regulator operation is concurrently maintained for a preset period of time thereby allowing the driver to re-open the door and close any left-open windows. Vehicle lockup can still be obtained by waiting until override features time-out or alternatively the motor vehicle door lockup can be obtained by using the key in the door lockset, thereby enabling intentional window opening for ventilation.
6. Automatic door lock system is disabled if a window is inadvertently left part-open whereby window regulator operation may also be maintained for a preset period of time after ignition lockup.
7. Lockup of the motor vehicle door and disablement of the window regulator may intentionally be obtained merely by an override provision, for example by the simultaneous pressing of both the door lock and window lock buttons, thereby enabling intentional window opening, such as for ventilation.

The presettable selection of any of several of these modes of operation by the motor vehicle operator is also believed to be advantageous in that it permits the driver to customize window regulator control to his preference or unique needs.

OBJECTIVES OF MY INVENTION

My invention has objectives which singularly or in combination may serve to provide enhanced motor vehicle window regulator operation relative with convenience, comfort, safety and security. These numerous objectives and advantages may be stated to include that:

An underlying goal of my invention is to provide electric window control for a motor vehicle which permits CLOSURE of an inadvertently "left-open" window (but not necessarily opening of window) after the key is removed from the ignition switch.

A betterment of my invention is to permit at least limited window regulator operation (e.g., window closure) even after the ignition key is removed and the driver begins to exit the motor vehicle whereupon the driver realizes that one or more windows have been forgotten in an open position.

Another object for my invention is to provide control which may be attained from a remote control key-lock device by maintaining "lock" button depression on the remote control and after elapse of a preset time period, all windows close.

Still another intent of my invention's teachings is to enable belated roll-up of all of the vehicle's inadvertently left-open windows, subsequent to ignition lockup, by maintaining the depression of the driver-side master door-lock button whereupon after a preset period of time window regulator operation is activated to effect closure of the windows which may have been left open.

Yet another object for my invention is to produce window roll-up of all left-open windows by turning the key in the driver's door lockset to the lock position and after elapse of a preset period of time, the window regulators are temporarily operated to effect the roll-up.

Another teaching of my invention involves the automatic closure of all left-open windows subsequent to ignition key removal from the ignition lock switch.

Still another object for my invention is to permit override of the antilockup features by simultaneous activation of "door lock" and "window lock" controls.

A remaining betterment provided by my invention is to disable the door lock system on at least the driver's door whenever a window is left partly open and furthermore to enable locking of the door by using the key in the door lockset is order to intentionally leave a window open for ventilation.

An important aspect of my invention is to usually limit the preset time duration of override features for a time duration of 30-60 seconds or so.

It is these and other goals and advantages of my invention which are herewithin described by way of a specification, drawings and claims.

DESCRIPTION OF MY DRAWINGS

My invention is illustratively described in the following drawing figures included herewith:

FIG. 1 Wiring diagram representative of a motor vehicle electric window regulator controls including timer controlled operation after key-switch turn-off.

Figure 2:
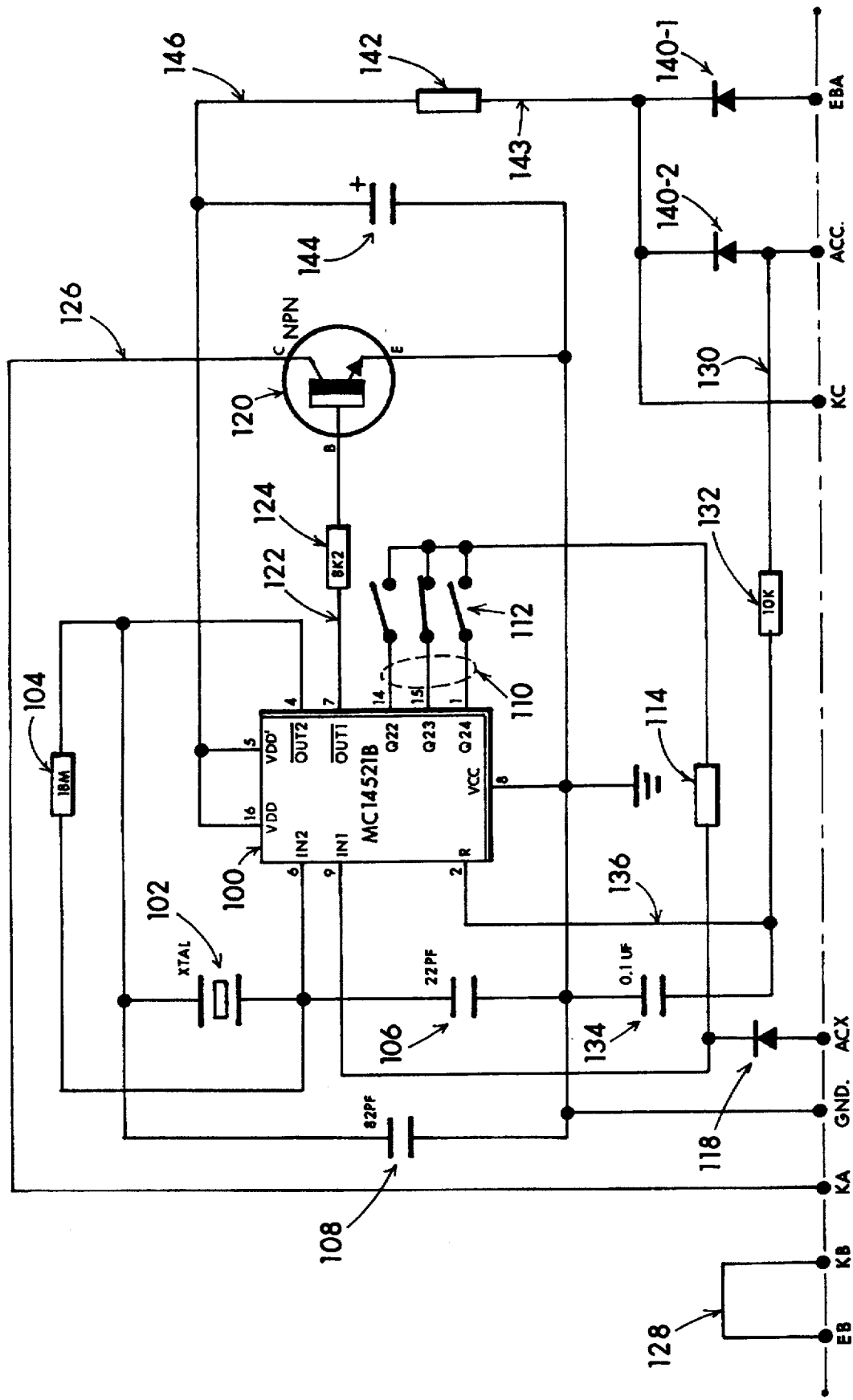

FIG. 2 Schematic diagram for a timer.

Figure 3:
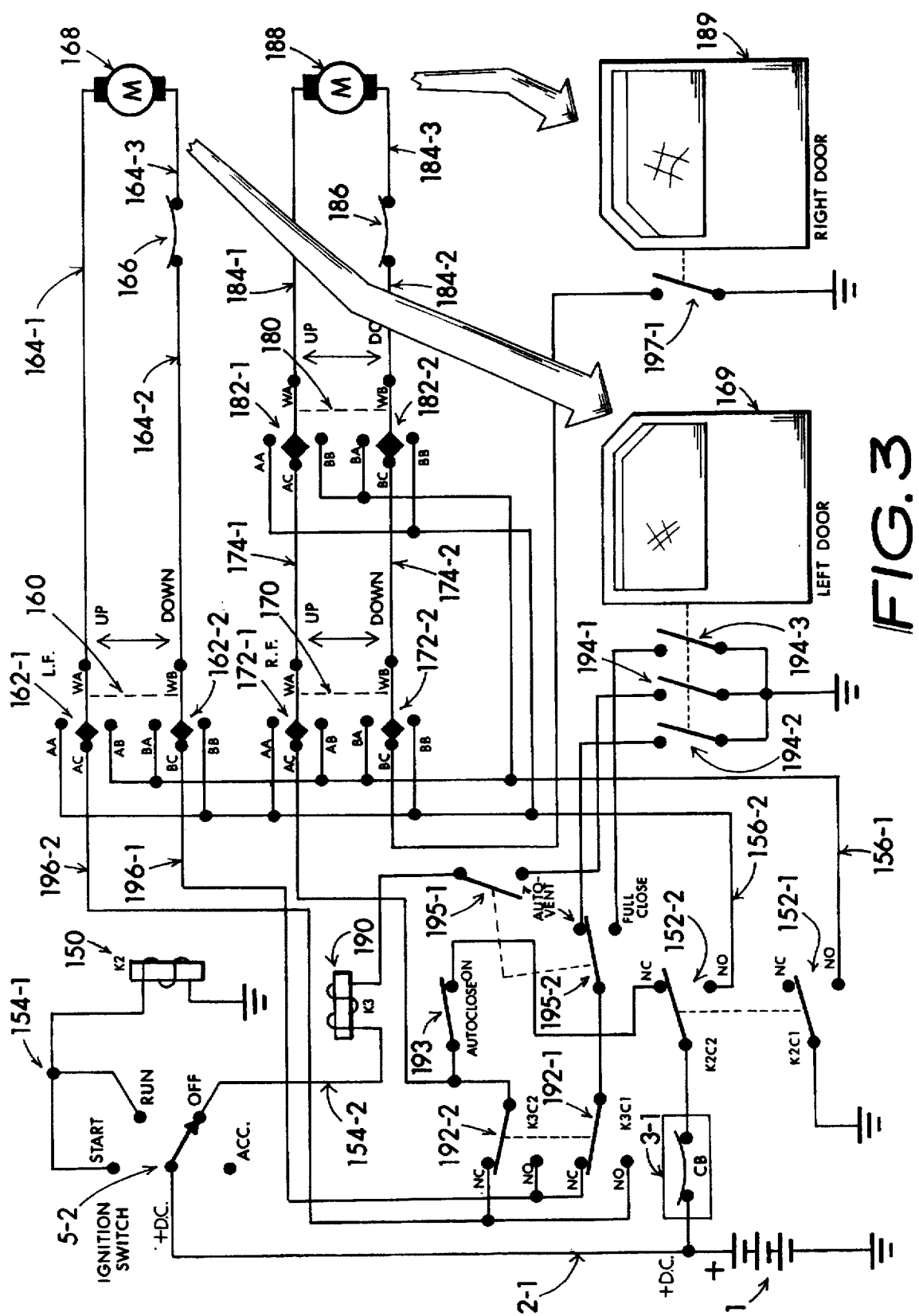

FIG. 3 Window regulator automatic closure circuit having provision for venting driver window.

Figure 4:
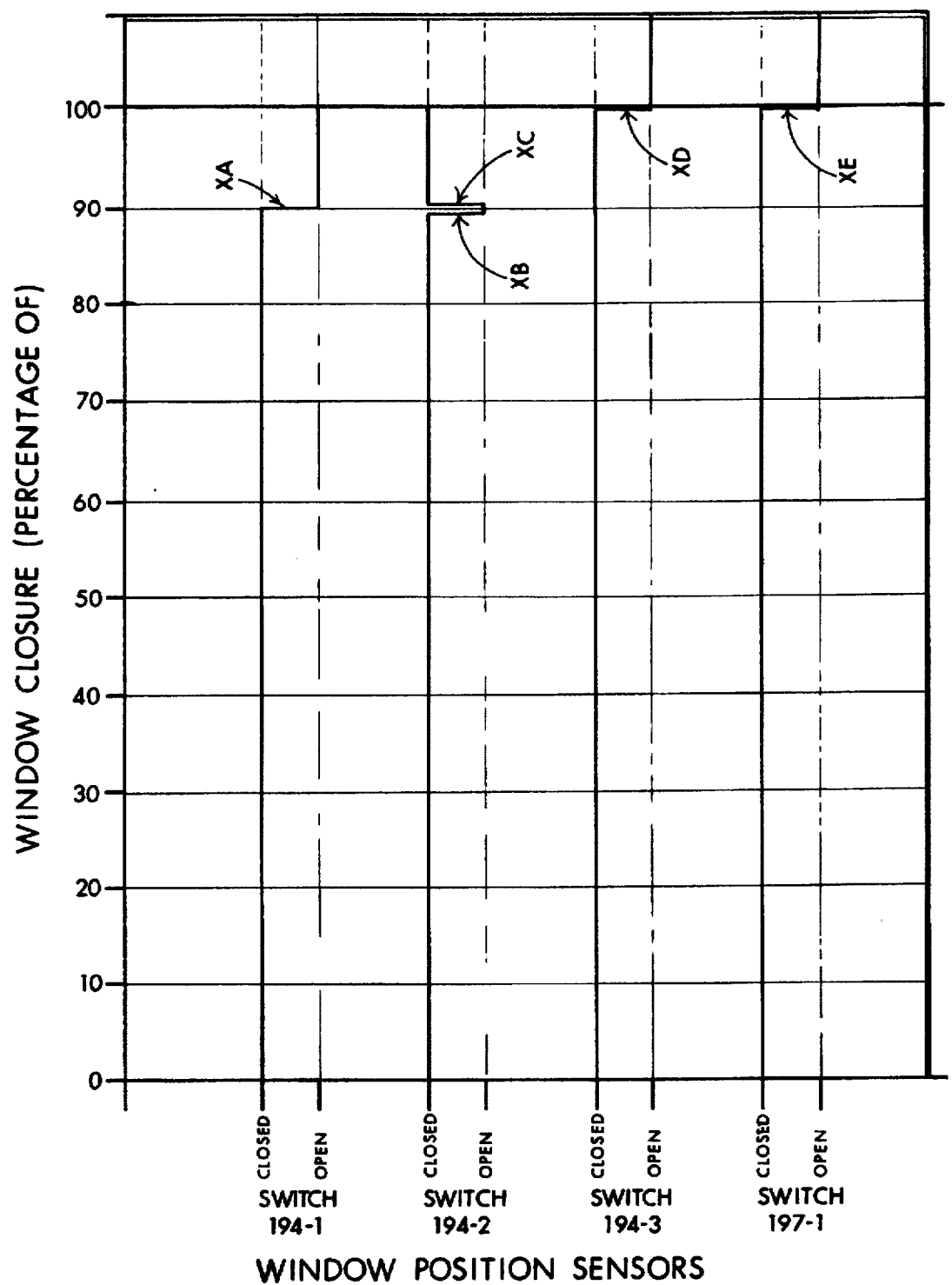

FIG. 4 Event diagram showing limit switch operation associated with the window regulator portion of FIG. 3.

Figure 5:
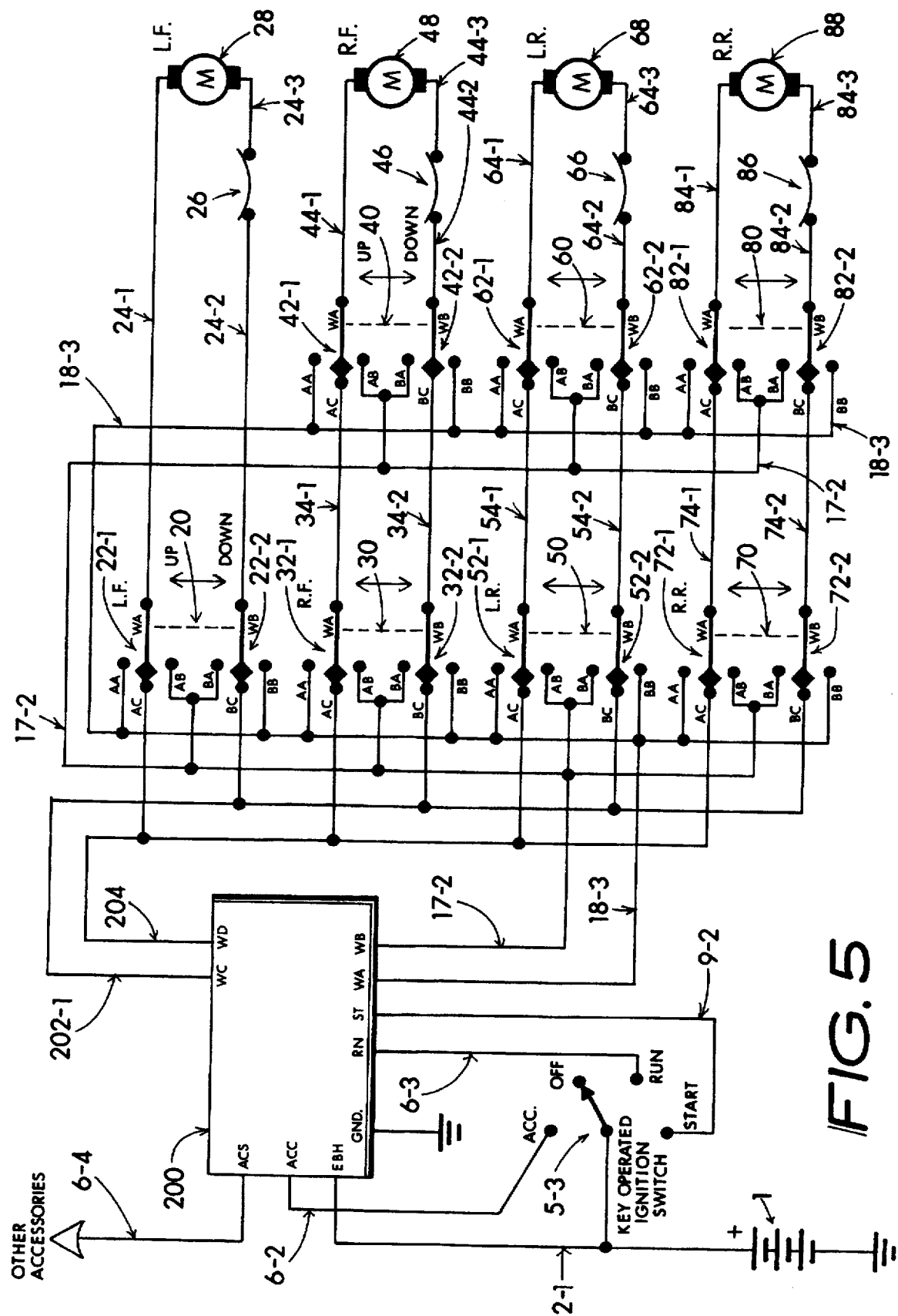

FIG. 5 Window regulator circuit for a motor vehicle.

Figure 6:
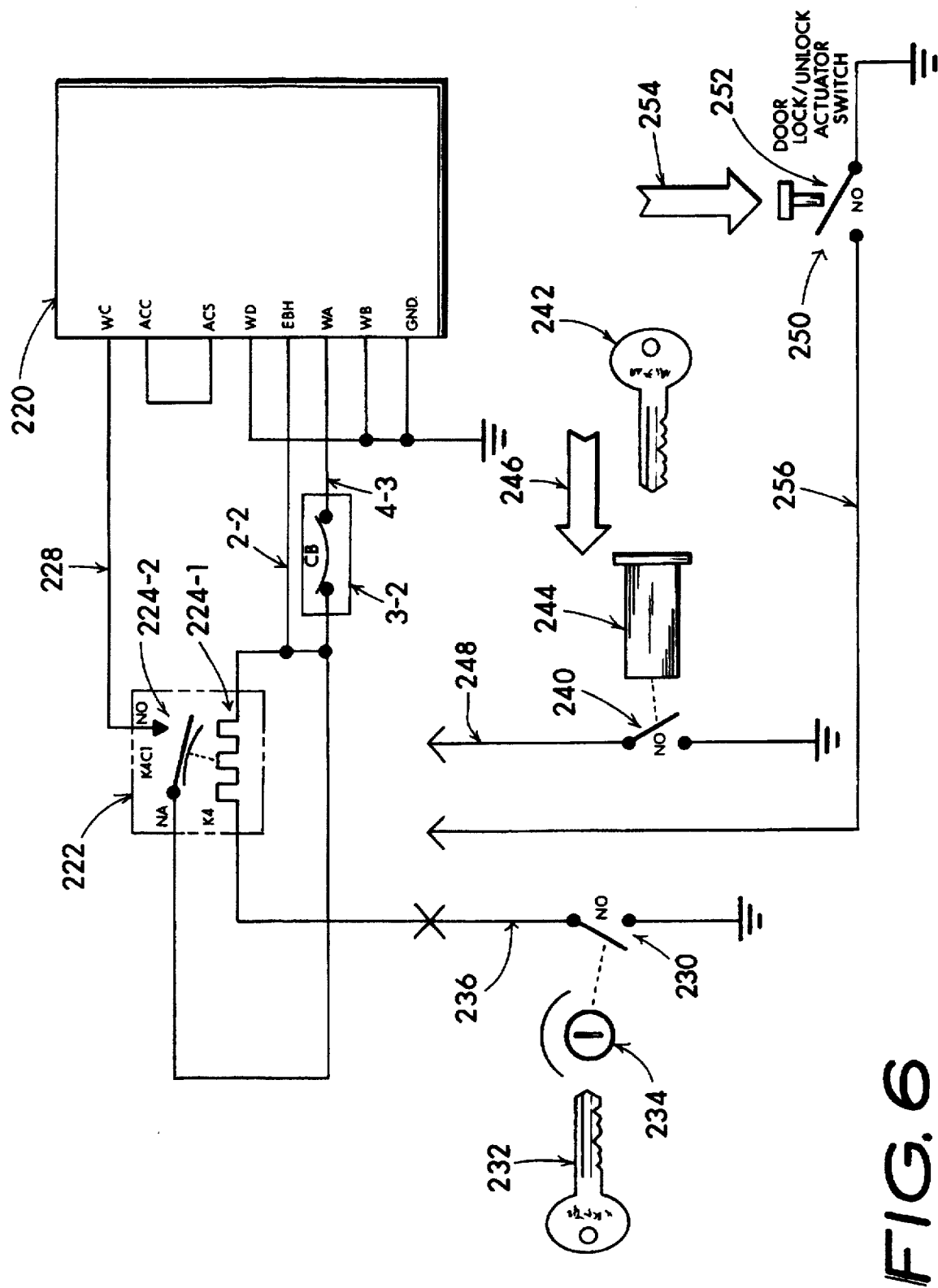

FIG. 6 Several window closure sub-circuits for use with the circuit of FIG. 5.

Figure 7:
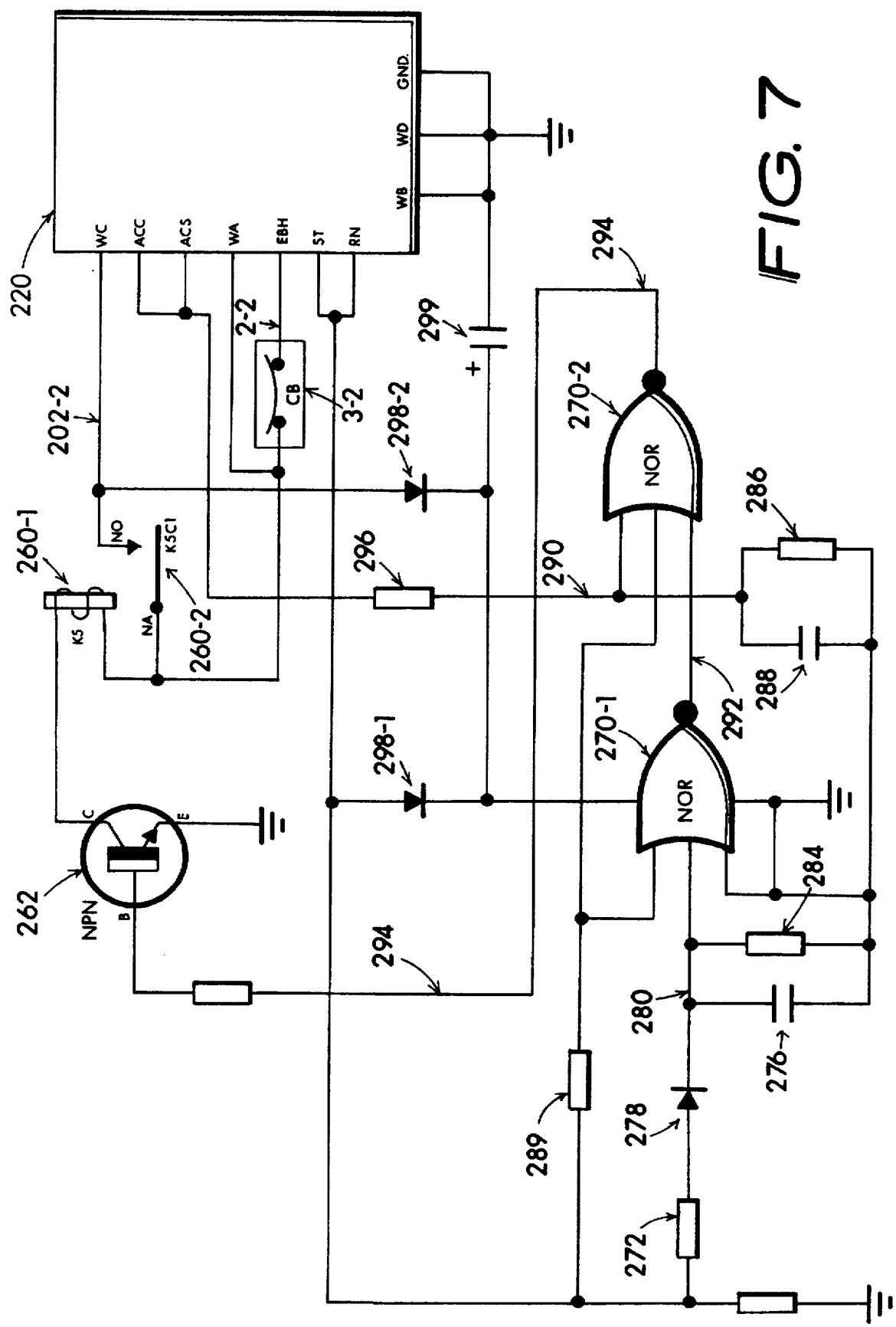

FIG. 7 Window control sub-circuit whereby automatic window closure occurs unless the key switch is turned to the ACCessory position before removal.

Figure 8:
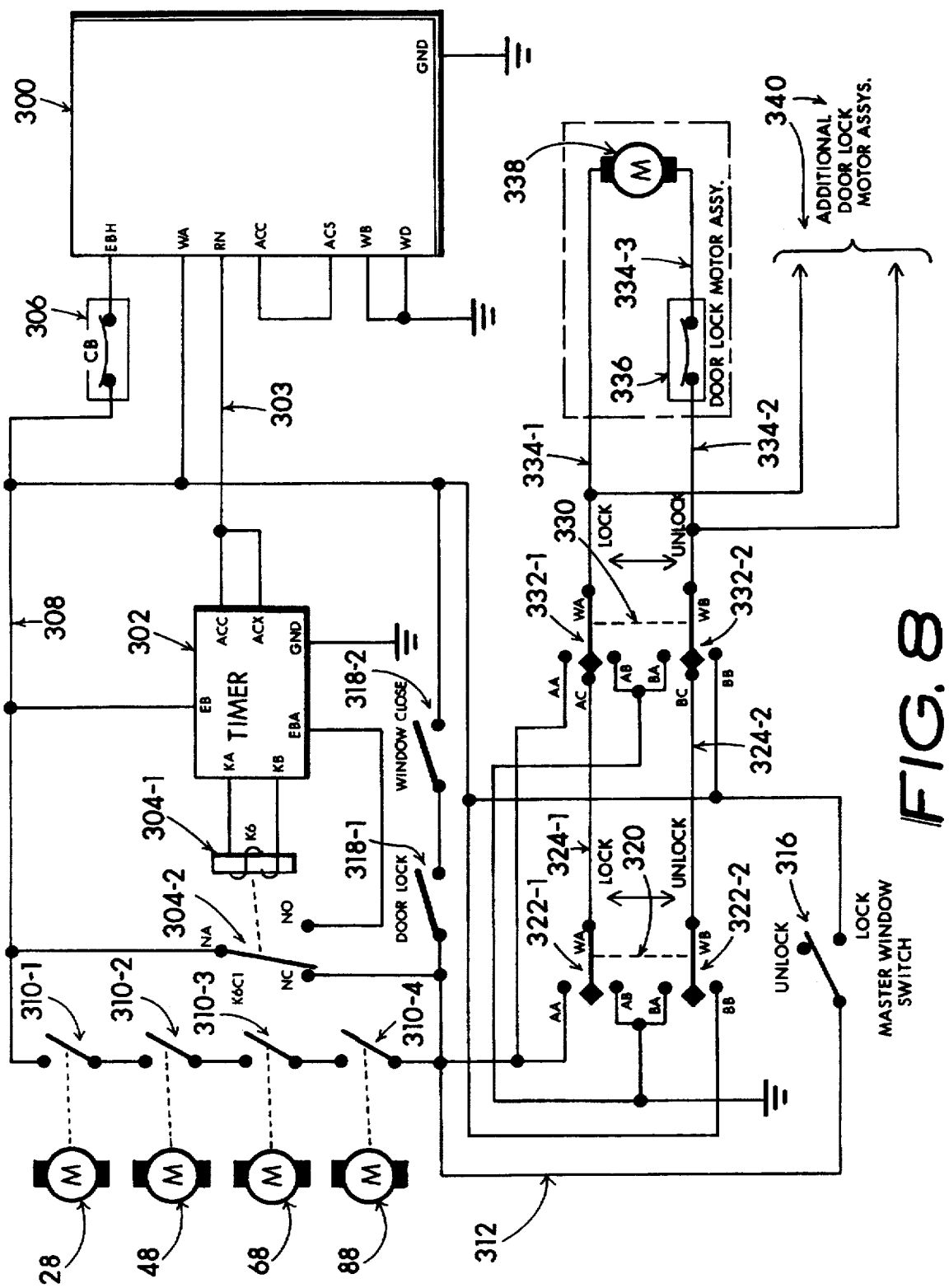

FIG. 8 Window control sub-circuit whereby electric door lock system is inhibited unless all vehicle windows are fully closed.

Figure 9:
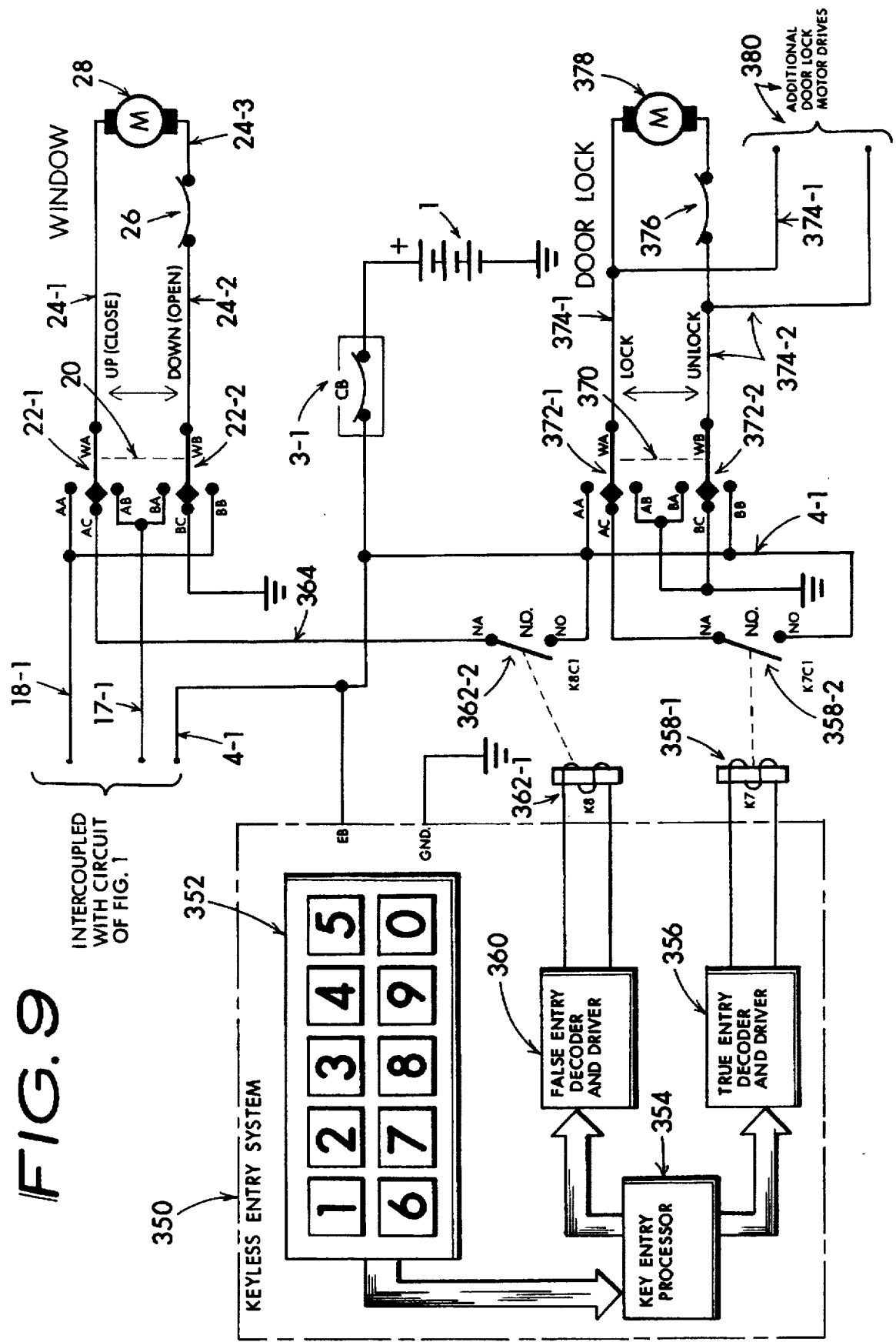

FIG. 9 Keyless entry sub-circuit which automatically closes windows if a false entry code is entered.

Figure 10:
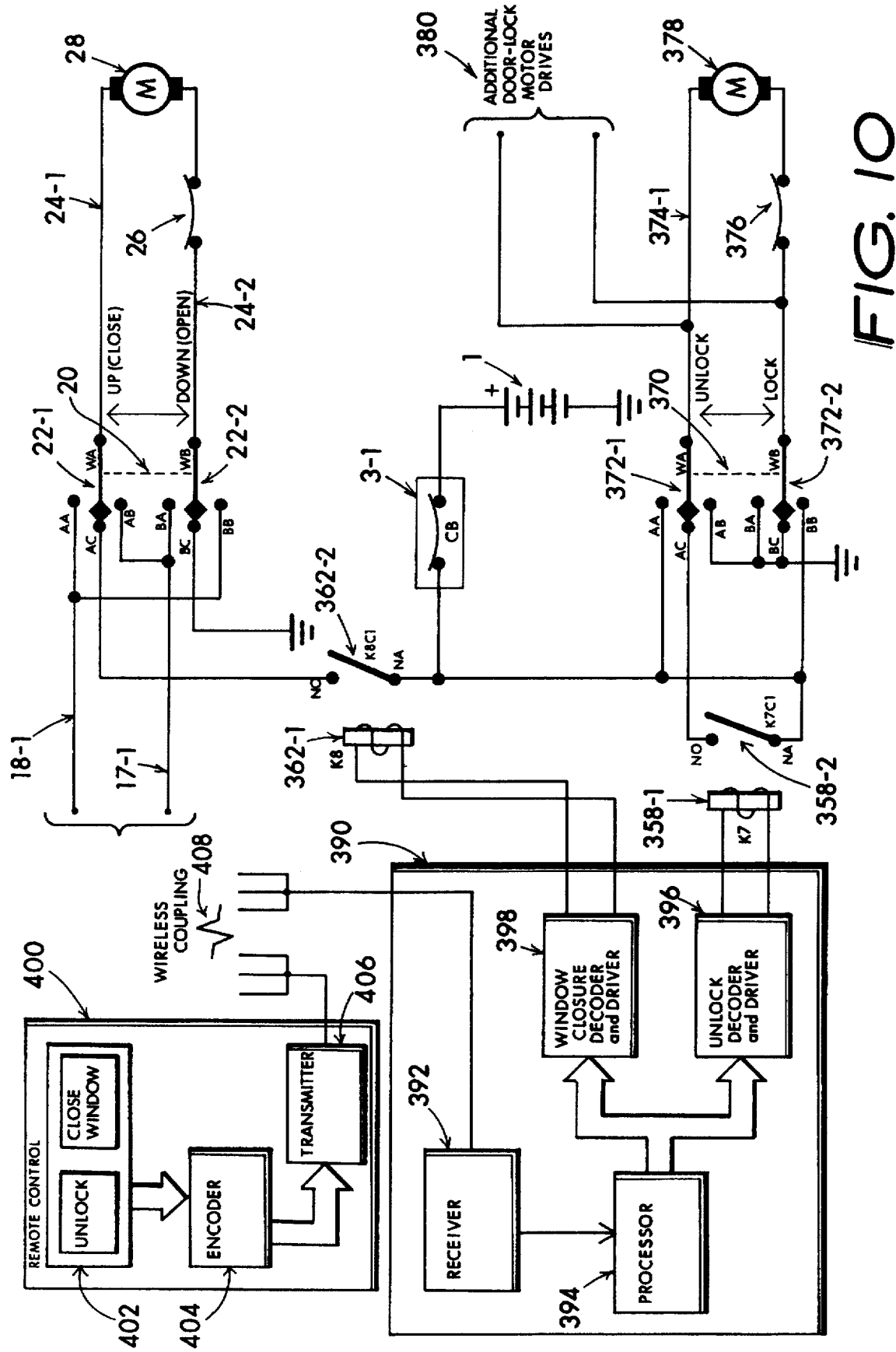

FIG. 10 Remote controlled entry system having an encoding provision for remotely closing the vehicle's windows even after ignition lockup.

Figure 11:
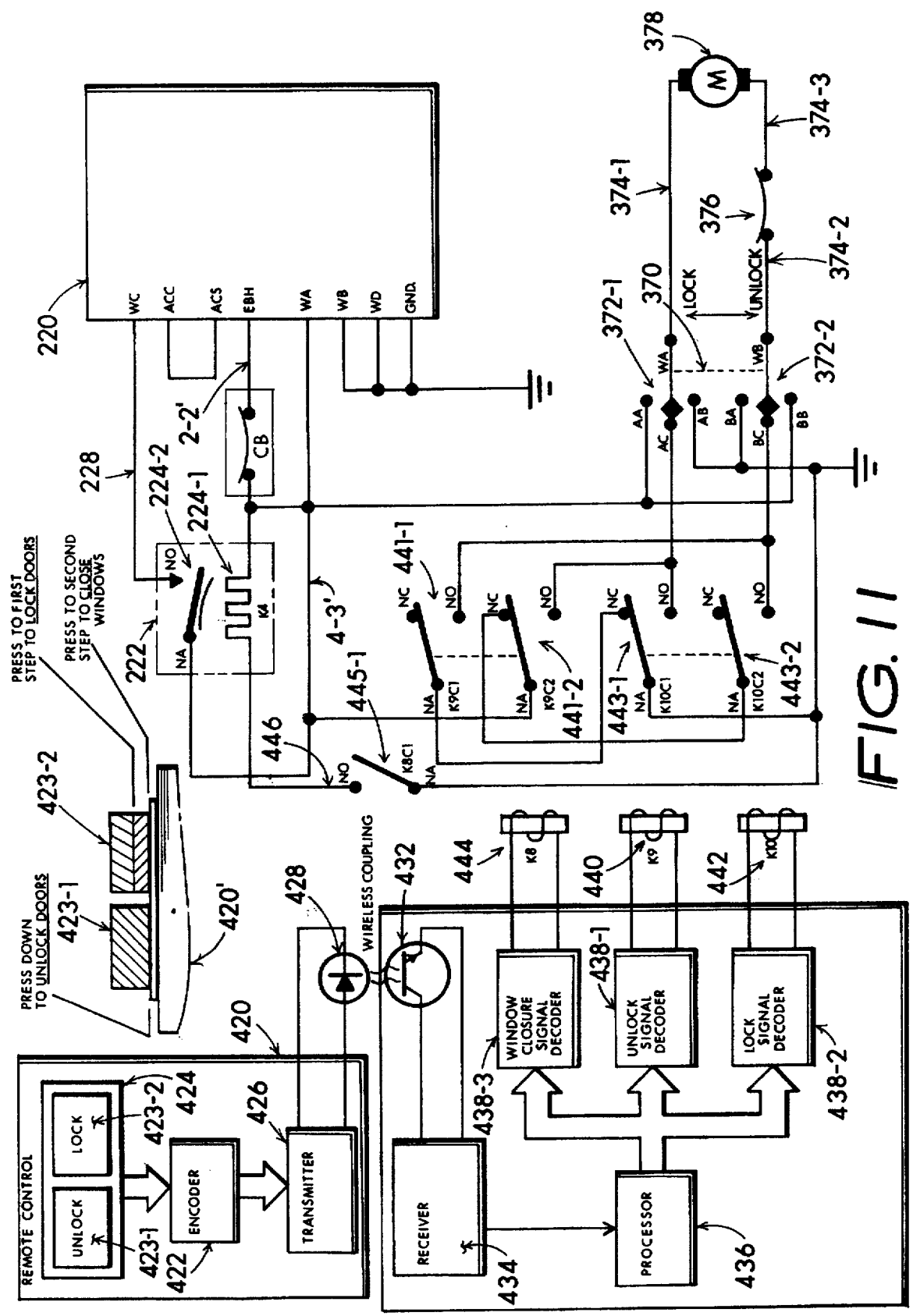

FIG. 11 Remote controlled entry sub-circuit used in conjunction with FIG. 6 to produce automatic window closure activated by the remote control unit.

DESCRIPTION OF MY INVENTION

A circuit arrangement appears in FIG. 1 that depicts a typical wiring hookup of a motor vehicle having electric window operators and including my invention's feature whereby electric window operation is maintained for a predetermined period of time after ignition switch turn-OFF and possibly encompassing even key removal and driver exit from the vehicle. A battery 1 (usually a lead-acid storage battery) typically provides about +12 volts DC on line 2-1 that couples with a circuit breaker 3-1 and a selector contact of a section of a switch 5-1 which may be a portion of a motor vehicle's usual ignition switch and may also be key operated. As shown the switch 5-1 has four positions: ACCessory, OFF, RUN and START as being representative of common practice. When the switch arm is moved to the RUN position the +DC power on line 2-1 couples with line 6-1 and may be used to power other accessories (not shown).

A diode 7 also feeds +DC power from line 6-1 (when the keyswitch 5-1 is in the RUN position) and onto line 9-1 and an input ACC of a timer 10. +DC power also couples through the circuit breaker 3-1 with line 4-1 and a relay contact set 4-1 (K1C1) as well as an input EB of the timer 10.

Pursuing operation of FIG. 1 even further, when the keyswitch 5-1 is in the RUN or START position, the +DC power on line 9-1 together with the +DC power on line 4-1 energizes the coil K1 of the relay 12 thereby closing the contact 14 and delivering +DC power to line 8, an input EBA of the timer and a circuit breaker 16. +DC power couples through the circuit breaker 16 with line 18-1 that feeds the AA and BB contacts of a multitude of switches 20,30,50,70 each of which are usually "driver position" window control switches as found in many automobiles. +DC power on line 18-1 also couples with a Master Window Switch 19 located near the driver which enables the driver to control operation of the electric windows from other locations within the vehicle when the switch 19 is in the LOCK (or open) position. When switch 19 is in the UNLOCK position +DC power couples through the closed switch to line 18-2 and subsequently with the AA and BB contacts of several passenger door position switches 40,60,80. Meanwhile the AB and BA contacts of all of the control switches 20,30, 40,50,60,70 and 80 find ground through common line 17-1.

The switch 20 may control the driver position door (usually front, left side position) window regulator action. To "roll-up" the window, the switch 20 movable contact arms 22-1,22-2 including contacts WA,WB are moved to make with respective contacts AA,BA, thereby delivering +DC on line 24-1 and ground or −DC on line 24-2. Line 24-1 couples with a window regulator motor 28. Line 24-2 couples through a circuit breaker 26 and with line 24-3 to the motor 28. In this setting and as shown in TABLE I, the applied motor voltage polarity causes the motor to run in a direction whereby window roll-up occurs. If an obstruction occurs, or when end-of-travel is reached the motor draws more current and the thermal circuit breaker 26 "opens", stopping the motor.

TABLE I

++ ELECTRIC WINDOW REGULATOR SWITCH OPERATION ++
Window Switches: 20,30,40,50,60,70,80,160,170

| FIXED CONTACT | MOVABLE CONTACTS | | WINDOW REGULATOR FUNCTION |
|---|---|---|---|
| | WA | WB | |
| — | | | |
| AA | X | O | Window Regulator Motor |
| BA | O | X | Power CLOSES Window |

TABLE I-continued

++ ELECTRIC WINDOW REGULATOR SWITCH OPERATION ++
Window Switches: 20,30,40,50,60,70,80,160,170

| FIXED CONTACT | MOVABLE CONTACTS | | WINDOW REGULATOR |
|---|---|---|---|
| — | WA | WB | FUNCTION |
| AB | X | O | Window Regulator Motor |
| BB | O | X | Power OPENS Window |
| AC | X | O | Window Operation in |
| BC | O | X | Neutral Position |

X = Contacts MAKE    O = Contacts OPEN

To "lower" the window, the switch 20 arms WA,WB are moved to make with respective contacts AB,BB, thereby delivering +DC on line 24-2 and ground or −DC on line 24-1. In this setting, the applied motor voltage polarity coupled via line 24-1 with one terminal of the motor 28 and via lines 24-2,24-3 and circuit breaker 26 with the other terminal of the motor 28 serves to cause the motor to run in an opposite direction whereby window roll-down occurs. Again, if an obstruction occurs or when end-of-travel is reached the motor draws additional current causing the thermal circuit breaker 26 to interrupt further power flow thereby stopping the motor.

The switches 30,40 together with a motor 48 may serve to operate the front seat passenger position (usually right side position) window regulator operation. When the moveable contacts WA,WB of the driver position switch 30 are moved to make with respective contacts AA,BA +DC power appears on line 34-1 while line 34-2 is grounded and effectively becomes −DC. The +DC, −DC levels on lines 34-1,34-2 couple through contacts AC,WA and BC,WB of the passenger position switch 40 thereby delivering power to lines 44-1,44-2. The +DC power on line 44-1 couples directly with a terminal of the motor 48. The −DC (or ground) power on line 44-2 couples via a circuit breaker 46 with line 44-3 and another terminal of the motor 4B. Polarity under this condition is suitable for running the motor direction whereby the window is raised.

When the moveable contacts WA,WB of the switch 30 are moved to make with respective contacts AB,BB the DC power coupled with lines 24-1,24-2 and through the switch 40 contacts with lines 44-1,44-2,44-3 via the circuit breaker 46 to the motor terminals is of suitable polarity to produce a direction of motor rotation whereby the window is lowered DOWN.

When the passenger activates the switch 40, moving the contact arms WA,WB to mate with respective contacts AA,BA +DC power on the line 18-2 (with switch 19 UNLOCKED or closed) couples with line 44-1 and a terminal of the motor 48 while −DC (or ground) power on line 17-1 couples with the other terminal of the motor 48 via lines 44-2,44-3 and the circuit breaker 46. As a result, the motor 48 runs to produce roll-UP of the window.

Again, moving the switch 40 contact arms WA,WB to make with the contacts AB,BB effectively reverses the DC power between lines 44-1,44-2 and the motor 42 terminals, thereby reversing the motor's direction and thereby producing roll-DOWN or lowering of the window.

In a similar way, the driver may operate switches 50,70 to produce roll-UP or roll-DOWN of the rear seat windows (in a four-door vehicle for example). If the moveable arm of the switch 50 is deployed whereby the contacts WA,WB mate with respective contacts AA,BA +DC power appears on the upper terminal of the motor 68, coupled thereto via lines 54-1, switch 60 contacts WA,AC and line 64-1. Concurrently, −DC ground power is delivered to the other motor 68 terminal via line 54-2, the switch 60 contacts WB,BC, line 64-2, circuit breaker 66 and line 64-3. Applied motor power polarity subsequently brings about roll-UP of the window by the window regulator. Making the switch 50 contacts between the moveable contacts WA,WB and respective contacts AB,BB effectively applies reversed motor drive polarity to the motor terminals thereby lowering the window DOWN. If a rear-seat passenger operates a rear door switch 60 whereby the moveable contacts WA,WB make with contacts AA,BA the resulting polarity of power applied to the motor 68 brings about roll-UP of the controlled rear window. Conversely, making contacts WA,WB with respective contacts BA,BB of the switch 60 reverses the motor polarity and causes roll-DOWN of the rear window.

If the moveable arm of the driver's other rear seat switch 70 is deployed whereby the contacts WA,WB mate with respective contacts AA,BA +DC power appears on the upper terminal of the motor 88, coupled thereto via lines 74-1, switch 80 contacts WA,AC and line 84-1. Concurrently, −DC ground power is delivered to the other motor 88 terminal via line 74-2, the switch 80 contacts WB,BC, line 84-2, circuit breaker 86 and line 84-3. Applied motor power polarity subsequently brings about roll-UP of the window by the window regulator. Making the switch 70 contacts between the moveable contacts WA,WB and respective contacts AB,BB effectively applies reversed motor drive polarity to the motor terminals thereby lowering the window DOWN. If a rear-seat passenger operates a rear door switch 80 whereby the moveable contacts WA,WB make with contacts AA,BA the resulting polarity of power applied to the motor 88 brings about roll-UP of the controlled rear window. Conversely, making contacts WA,WB with respective contacts BA,BB of the switch 80 reverses the motor 88 polarity and causes roll-DOWN of the rear window.

Immediately upon turn-OFF of the ignition switch 5-1 the power on line 9-1 ceases as applied to the ACC input of the timer 10. The timer. 10 continues to maintain the contacts 14 CLOSED for a predetermined period of time after loss of +DC power on the ACC input. In other words, the relay coil 12 (K1) remains energized, receiving power provided between the timer terminals GND and EB. After elapse of a period of time preferably set between about 20 seconds and several minutes, the relay coil 12 de-energizes and the contacts 14 drop-out (e.g., open) thereby denying +DC power on line 8. In the time window between ignition switch shut-OFF and drop-out of the relay contacts 14 the +DC power is maintained on line 8 via the closed relay contacts and full electric window regulator operation is maintained. As a result, the driver or other passenger is able to at least CLOSE any inadvertently left-OPEN windows even after ignition switch turn-OFF. After the elapse of the timing period, the contacts 14 do open thereby safeguarding undesired or unauthorized operation of the electric window regulators.

A configuration for a timer 10 suitable for use with the hookup of FIG. 1 is representatively shown in the schematic of FIG. 2. A type MC14521B (Motorola Inc., Phoenix, Ariz.) integrated circuit counter 100 arrangement includes a clock crystal 102 (XTAL), resistor 104 and capacitors 106,108 as a source of timing frequency (typical frequency may be economically derived from a common 32.768 Khz watch crystal). The resulting clock action advances the counter stages internal with the device 100 whereupon after occurrence of a finite number of clock cycles and the resulting elapse of a period of time the Q22,Q23 and Q24 outputs progressively reach a HIGH state. One of the outputs is selected by means of a jumper or a "DIP switch" 112 to couple with line 116 and the IN1 input of the device, via resistor 114. An /OUT1 terminal from the device 100 delivers an inverted signal on line 122 that couples with the base of an NPN transistor 120 via resistor 124.

When the keyswitch 5-1 of FIG. 1 is moved to RUN or TART, about +12 volts DC appears on line 9-1 that couples with the ACC input of the timer 10. In FIG. 2, the ACC input couples through a diode 141-2 and a resistor 142 to deliver +DC voltage on line 146 that charges a capacitor 144 thereby delivering +DC operating power to the VDD,VDD' inputs of the device 100. A simulataneous application of the +DC power brought through the ACC input and appearing on line 130 couples through a resistor 134 that, together with a capacitor 134 serves as a low-pass noise filter. The result is that the +DC level also appears on line 136 and acts as a HIGH input coupled with the reset "R" input of the device 100. When reset, the Q22,Q23,Q24 outputs of the intrinsic counter stages of the device 100 are logic LOW which couples with line 116 and therefrom is inverted as it appears as a HIGH state on the /OUT1 terminal and as coupled with the base of the NPN transistor 120. The result is that the transistor 120 turns-ON effectively pulling the collector line 126 to ground. A jumper merely couples the timer terminals EB with KB while the transistor collector line 126 couples with the timer terminal KA. As a result, and by referring to the earlier FIG. 1 it is shown that the relay coil 12 and the relay contacts 14 are closed enabling the earlier said operation of the window control circuitry.

When the ignition switch 5-1 is turned OFF, the +DC level on the ACC input of the timer drops to ground. Now +DC power is provided to the timer circuitry through the +DC level on line 8 of FIG. 1 that couples with the EBA input of the timer of FIG. 2 and through a diode 140-1 to charge the capacitor 144 via the resistor 142. Realize now that the ACC input is unpowered, effectively a logic LOW level as coupled with the reset input "R" of the counter 100. A low state on the reset input enables the counter and it advances states under clock control. Eventually after succession through a predetermined number of counter states, the Q23 output rises HIGH (presuming that the shown contact of switch 112 is closed-as depicted in the figure). As a result the level on line 116 rises HIGH and subsequently the level on line 122 drops LOW thereby turning-OFF the flow of current through the NPN transistor 120. Overall, the effect is that the relay coil 12 is de-energized and the relay contacts 14 OPEN whereupon the +DC level on the EBA input of the timer ceases. At this point, both the ACC and the EBA inputs are unpowered and the relay contacts 14 remain open, disabling further operation of the window regulator circuitry as powered through the relay contacts 14.

Automatic roll-up of the vehicle windows, followed by automatic partial lowering of at least the driver's window to permit ventilation (for example, while the vehicle is parked) is depicted in my hookup of FIG. 3. Usually the partial opening is set for about an inch although this is an engineering choice and can actually be any amount between fully open and nearly closed, depending upon the designed in predeterminations. I also anticipate that the actual amount may be made "adjustable", whereby the driver might be able to variously select any one of several opening extents. The vehicle battery 1 couples with the ignition switch 5-2 and when the ignition switch is set to the RUN (or START) position, +DC power couples with and energizes the relay K2 coil 150. This closes the NO contacts of the relay contacts 152-1,152-2 with the result that line 156-1 is grounded while line 156-2 is coupled with line 4-2 and therefrom provided with +DC power. This enables the operation of the window regulator motor drive circuitry. When the window control switch 160 is moved "UP" making contacts WA,AA and WB,BA, +DC power appears on line 164-1 and line 164-2 is grounded. As a result the motor 168 is provided with DC power through the circuit breaker 166 and line 164-3 having a polarity which will drive the motor to raise (e.g., CLOSE) the window associated with the vehicle door 169. Alternatively, when the switch 160 is moved "DOWN" making contacts WA,AB and WB,BB, +DC alternatively appears on line 164-2 while line 164-1 is grounded. As a result the motor 168 drives in the opposite direction so as to lower (or "OPEN") the window associated with the vehicle door 169.

The other door switches 170,180 operate in conjunction with switch contacts 172-1,172-2,182-1,182-2 to provide +DC and ground connections via lines 174-1,174-2, 184-1, 184-2,184-3 and circuit breaker 186 to produce rotation and counter-rotation of the motor 188 whereby the window associated with the door 189 is raised (e.g., "CLOSED") and lowered (e.g., "OPENED") depending upon the switch 170 or 180 positions.

Switches 194-1,194-2 operate in conjunction with the window associated with the left door 169, while switch 197-1 operates in conjunction with the right door window portion to sense window position. For purpose of this discussion, but in no way as a limiting factor upon the scope of my invention, assume that the window may be automatically partly opened for ventilation by about 10% of the fully closed position (e.g., remaining about 90% closed). A representation of this is depicted in my event diagram of FIG. 4 which shows that the switch 194-1 is closed when the window is less than about 90% closed, the switch 194-1 opens XA when the window is about 90% closed and the switch remains open when the window is between about 90% and 100% (e.g., fully) closed. At the same time, the other switch 194-2 operating in concert with the same door 169 window is usually closed but it does open XB when the window is about 90% closed and then it closes XC again when the window closure exceeds about 90%. Perhaps for this example, we can say that the switch 194-2 is open between about XB (89.5%) and XC (90.5%) window closure and otherwise the contacts of the switch 194-2 are closed.

When the ignition switch of FIG. 3 is moved from the RUN to the OFF position, several modes of operation are initiated:

One mode occurs if the LEFT door 169 window is left mostly open (or at least more than about 10% open). Upon ignition switch turn-OFF, relay 150 (K2) is de-energized and the relay NC contacts 152-1,152-2 are closed effectively opening the connection with lines 156-1,156-2. In the OFF position, +DC power also couples through the ignition switch with one end of a relay coil 190. The +DC level on line 4-2 is routed through the NC contacts 152-2 with an driver operable AUTO-CLOSE switch 193. When this switch is ON, +DC power routes to the arm of relay contact set 192-2. With the window substantially open, switches 194-1, 194-2 are both closed and as a result of switch 194-1 being closed and providing a ground path for the other end of the relay coil 190, the relay is energized thereby switching the contacts 192-1,192-2 to the NO contacts. Switch 194-2 is also closed and if the driver operable FULL-CLOSE/AUTO-VENT switch 195 is closed a ground connection is routed to the arm NA of relay contacts 192-1 and therefrom through the NO contacts with line 196-1 and contact BC of the window operator switch 160. Also, +DC power is coupled with line 196-2 through the now closed NO relay 192-2, whereupon line 196-2 couples with the contacts AC of the window operator switches 160,170. As a result of this temporal connection, the motors 168,169 are energized to drive the window up and CLOSE the windows. When window associated with the left door 169 is about 90% closed, switch 194-2 OPENS XB and interrupts the ground return on line 196-2 and stops the window regulator motors. As a result, the driver side window stops and is set about 10% open. The right door 189 window however drives all of the way closed because ground for contact BC of the window operator switch 172-2 is found through the limit switch 197-1 which does not open XE until the window associated with the right door 189 is snugly closed.

Another mode of operation occurs if the left door 169 window is less than about 10% open (or fully closed). In this event, switch 194-1 is open and switch 194-2 is closed (see FIG. 4). As a result, the relay coil 190 (K3) remains unenergized and the relay contacts 192-1, 192-2 remain in the normally closed (NC) positions. The result is that line 196-1 is provided with +DC through the relay contacts 192-2 whilst line 196-2 is grounded through the relay contacts 192-1 in series with the closed switch 194-2. As a result of the polarity of DC power impressed between lines 196-1,196-2 the window regulator drive motor 168 operates to lower the left door 169 window to a point where switch 194-2 opens XC, whereupon the drive motor stops, automatically leaving the window about 10% open. The electrical hookup associated with the right door 189 window operator motor 188 is still arranged whereby the window automatically rolls-up to be fully closed.

Yet another mode of operation is encountered wherein the AUTOCLOSE switch 193 is opened by the motor vehicle operator. Under this condition, no +DC power couples with the relay contacts 192-2 and door operator switch 172-1 contact AC. As a result, no automatic closure operation is provided and the windows remain where-ever the driver or passengers left them at time of ignition turn-off.

A further mode of operation is encountered whereby the FULL-CLOSE/AUTO-VENT switch 195 is opened by the driver. In this condition, relay K4 is maintained by the ground connection obtained through the switch 195 and limit switch 194-3, whereby the limit switch 194-3 opens XD when the window is fully closed, thereby stopping further motor drive.

An extension of the teachings of FIG. 1 appear in my FIG. 5 wherein I show a block 200 including circuitry fundamental to my invention's teachings. A key operated ignition switch 5-3 interfaces with the circuitry earlier described for FIG. 1 including ACCessory lead connection 6-2, a RN (run) lead connection 6-3 and a STart lead connection 9-2. My invention's control circuitry provides several outputs, including WA line 18-3, WB line 17-2, WC line 202-1 and WD line 204. +DC battery 1 power on line 2-1 couples with the termination, while the ACS connection provides an output 6-4 to other (optional) accessories. It is the purpose of this particular FIG. 5 to serve as the basis for several variations of my invention's essence which will unfold in subsequent figures and through further description. Remaining portions of this FIG. 5 as relate to the window control switches and window regulator motor drives operate similar to like numbered portions of FIG. 1.

In FIG. 6 a switch 230 is coupled with an exterior door lock tumbler 234 which may accept a key 232. As with usual practice, when the key is turned one way it "locks" the door and when it is turned the opposite way, it "unlocks" the door. When the driver exits from the vehicle, a left-open window may be noticed. In the past, this meant re-entering the vehicle and turning the ignition switch ON, raising the window, removing the key from the ignition switch and exiting the vehicle again. With my invention, I offer that when a window remains open, merely turning the keylock tumbler 234 to the "lock" position closes the switch 230 which is mechanically coupled with the tumbler. Holding the key and tumbler in the "lock" position grounds line 226 that couples with a thermal element 224-1 which is part of a thermal time-delay relay 222. After passage of a few seconds, the contacts 224-2 CLOSE, thereby coupling +DC power between line 2-2 and line 228 that couples with the WC connection of the window control circuit hookup 220 earlier depicted in FIG. 5. For the operator this means that a noticed "left open" window may be quickly and conveniently closed merely by maintaining the key lock in the "lock" position for several seconds.

A variation of my exterior lock controlled window closure provision also appears in FIG. 6 whereby a normally open switch 240 is coupled with the key lock tumbler barrel 244. Ordinarily the tumbler barrel is spring loaded towards the key and the switch 240 is maintained OPEN. When a key 242 is inserted, it may be turned left and right to lock and unlock the tumbler mechanism. If a window is noticed to have been left open, the driver merely has to press inward on the key whereby the lockset tumbler barrel is moved forward 246 closing the switch 240. As before, this grounds line 248 that couples with line 226 and energizes the delay relay 222 heater 224-1 whereupon after a few seconds, the inadvertently left open window(s) automatically roll-up.

Still another variation shown in FIG. 6 involves the usual interior door LOCK/UNLOCK switch. A separate switch section 250 couples with the actuator 252 and when a window is noticed to be open, merely maintaining pressure on the lock button and keeping the switch 250 closed grounds line 256 that couples with the line 226 and activates the delay relay 222 which means that, after several seconds, the left-open windows automatically close. In each of these arrangements, I have found that a time duration of 2-4 seconds is appropriate for the thermal delay of the relay 222.

When the key operated ignition switch 5-4 is turned-OFF, automatic roll-up of any left-open windows is produced by the arrangement of FIG. 7. Furthermore, the automatic roll-up may be defeated (e.g., made inoperative) merely by briefly turning the ignition key to the ACCessory position before returning to the OFF position and removing the key.

Initially the ignition switch 5-3 portion of the window control circuitry of FIG. 5 is turned from the OFF position to the RUN (or START) position. +DC power on line 2-4 derived from the RN and ST connections with my window control circuitry 220 is coupled with resistors 272,289 and a diode 298-1. Power flows through the diode 298-1 to charge a filter capacitor 299 and provide +DC operating levels for the shown C-MOS 3-input NOR gates 270-1,270-2. The +DC level is also coupled through a resistor 272 and a diode 278 whereupon it charges a capacitor 276 and develops a logic HIGH state on line 280 that couples with an input of the NOR gate 270-1. The +DC level is furthermore coupled through the resistor 289 and appears as a logic HIGH state at an input of each of the NOR gates 270-1, 270-2. It is the HIGH state coupled with the NOR gate 270-2 input which predominates and produces a LOW from the NOR gate 270-2 on line 294 as coupled with an NPN transistor 262. The transistor 262 remains OFF and the relay contacts 260-2 remain OPEN.

When the ignition switch 5-2 is next turned OFF, the logic level coupled through resistor 289 immediately drops to a LOW state at each of the NOR gate 270-1,270-2 inputs. However, a charge remains across the capacitor 276 that takes some time to drain off with a time constant determined by the value of a resistor 284. In effect, the level on line 292 remains at a LOW state and the other two inputs of the gate 270-2 are also LOW state. The output of the gate 270-2 drives HIGH turning the transistor 262 ON and driving the relay coil 260-1 which closes the relay contacts 260-2. The relay contacts remain closed until the charge across the capacitor 276 is drained down by the resistor 284 to a point where the NOR gate 270-1 switches to a HIGH state at its output. Ordinarily, the time constant of the capacitor 276 and resistor 284 is set for several seconds duration, or equivalent to about the time it takes to roll-up a fully open window using the electric window regulators. Closure of the relay contact 260-2 conveys +DC power to line 202-2 that couples through a diode 298-2 to keep the capacitor 299 charged irrespective that the line 2-4 has dropped to near ground level. The +DC level on line 202 also couples with the WC connection portion of the window control circuitry 220 and effectively activates all of the window regulator motors to automatically CLOSE all of the windows which may inadvertently be open.

Sometimes it is desirable to leave one or more windows partly open in order to ventilate the vehicle when it is parked. In order to defeat the automatic roll-up feature, the ignition switch 5-3 is turned from the RUN position directly to the ACCessory position before it is turned OFF. When in the ACCessory position, +DC appears at the ACC connection with the window regulator circuit 220 of FIG. 7. The ACC jumpers not only with the ACS connection but also with a resistor 296 that charges a capacitor 288 to achieve a logic HIGH state on line 290 that couples with an input of the NOR gate 270-2, driving the state of line 294 LOW and effectively maintaining the relay contacts 260-2 OPEN. When the ignition switch is returned to OFF from the ACCessory position no further charge is provided to the capacitor 288. A resistor 286 subsequently drains the charge from the capacitor 288 and it is the time constant established by these two components which blocks the automatic window roll-up feature. Therefore it is necessary that the time constant of the capacitor 288 and resistor 286 is longer than the time constant of the capacitor 276 and resistor 284 and in any event the time constants that are involved are ordinarily in the range of about 2 to 10 seconds.

If any regulated window in the vehicle is left open, the hookup shown in FIG. 8 inhibits operation of the vehicle's electric door locks after the ignition switch is turned-OFF. The essential window operator circuitry of FIG. 5 is included in the block 300 whereby the connection EBH delivers +DC power through a circuit breaker with line 308 that seeks line 312 via the series arrangement of switches 310-1,310-2,310-3,310-4. Each of these switches are mechanically linked with the electric window regulator associated with each of the vehicle's windows, including the motors 28,48,68 and 88. Each of the switches are CLOSED only when the associated window is fully closed, otherwise the switch is OPEN interrupting power flow between lines 308 and 312. When the ignition switch 5-3 is set to the RUN position the +DC level on connection RN appearing on line 303 couples with the ACC and ACX inputs of the timer 302 (see FIG. 2 for details). The +DC level on the ACC input resets the timer's internal counter 100. The +DC level on the ACX input couples through a steering diode 118 with line 116 and pulls line 116 HIGH thereby developing a LOW state on line 122 that couples with the base of the NPN transistor 120. The result is that the relay coil 304-1 remains unexcited and the NC relay contacts 304-2 remain closed effectively shunting the series window limit switches 310-1,310-2,310-3,310-4 as long as the ignition switch is in the RUN position. As a result the driver and any passenger may operate the electric door lock system. With +DC on line 312 and the master window switch set to "lock", +DC appears on the AA,BB contacts of the door lock switches 320,330. Usually switch 320 is near the driver's position and when the moveable switch arms WA,WB make with respective contacts AA,BA +DC appears on line 324-1 while line 324-2 is grounded. The immediate levels on lines 324-1,324-2 couple through the contacts WA,AC and WB,BC of the passenger position door lock switch 330. The door lock motor 338 couples with the switch 332-1 via line 334-1 and with the switch 332-2 via line 334-2, circuit breaker 336 and line 334-3. As a result, the drive motor 338 operates to LOCK the door. Additional door locks 340 are usually used on each passenger door.

When the moveable arm WA,WB of switches 322-1, 322-2 is moved to the respective contacts AB,BB, signal polarities appearing on lines 324-1,324-2 are reversed and the motor 338 UNLOCKS the door.

When the driver turns the ignition switch 5-3 OFF, the level on line 303 drops to ground and the ACX input of the timer is driven logic LOW. As a result, the steering diode becomes reverse biased and the output signal on line 122 is driven HIGH producing turn-ON of the transistor 120. The relay coil 304-1 is energized and the NO relay contacts 304-2 are closed (whereas the NO contacts are opened). The now closed contacts conveys the +DC level on line 308 to the EBA terminal of the timer providing continuation of DC power for operating the timer. Under this condition, with the NC relay contacts 304-2 OPEN, if any one or more of the switches 310-1,310-2,310-3,310-4 are OPEN due to the associated window not being fully closed no +DC power is coupled with line 312 and the door operator circuitry is inoperative to LOCK any of the doors. Line 308 is maintained with the contacts BB of each of the door lock switches 320,330 thereby enabling UNLOCKING of the respective doors. Only LOCK is inhibited. After a predetermined period of time, usually on the order of 10–60 seconds, the timer 302 "times-out" and the relay coil 304-1 is de-energized. As a result the contacts 304-2 revert to their normal position which means power is interrupted to the timer EBA terminal and +DC power is fully coupled with line 312 permitting door lockup irrespective of window settings. One of the neat features of this scheme is that the window regulators may be hand-crank operated instead of using the shown motors 28,48,68,88 and under such an arrangement door locking is also fully inhibited until the windows are "hand-cranked" closed or until the timer 302 times-out.

Optional override of the "window-ajar lockout" control of the electric door lock system may be provided for an operator's convenience through the expedient of simultaneously closing both the DOOR LOCK switch 318-1 and WINDOW CLOSE switch 318-2 whereby series closed switches effectively shunt the window open sensor switches 310-1,310-2,310-3,310-4 and permit normal door lockup operation. Switch 318-1 is mechanically coupled with the vehicle's usual DOOR LOCK switch mechanism whereas the switch 318-2 is coupled mechanically with the usual WINDOW CLOSE control button, each of which are customarily located at the driver position.

A keyless entry system 350 utilizing a keyboard 352 into which a "code" may entered to gain vehicle unlocking and entry is depicted in my FIG. 9 diagram. I show interface not only with portions of the earlier discussed electric window regulator circuitry of FIG. 1, but also with the electric lock circuitry similar to that which is shown in FIG. 8. In the arrangement of FIG. 9 the vehicle storage battery 1 couples through the circuit breaker 3-1 with line 4-1 which delivers +DC power to contacts AA,BB of door lock switch 370. When the moveable switch contacts WA,WB are moved by the operator to make with the respective contacts AA,AB, +DC power on line 374-1 couples with a terminal of the electric lock drive motor 378 while the ground or –DC power found on line 374-2 couples via a circuit breaker 376 with the other drive motor 378 terminal.

When the moveable switch contacts WA,WB are alternatively moved by the operator to make with contacts AB,BB, polarity of the DC power applied to the electric lock drive motor 378 is effectively reversed and unlocking occurs. Additional door lock drive motors 380 on any passenger doors may also be coupled in parallel with lines 374-1,374-2 to effect full vehicle lockup (or unlocking).

Ordinarily the vehicle operator uses a private code to unlock the vehicle. For example, if the predetermined code is 3712, the operator merely presses the keys on the keyboard 352 to enter 3 7 1 2 in that sequence and the key entry processor 354 in conjunction with the true entry decoder and driver recognizes this as a valid and proper code. As a result, relay coil 358-1 is energized, closing contacts 358-2 which couple the +DC power on line 4-1 with line 359 and thence with contact AC of switch 372-1. The moveable contact WA normally makes with contact AC and as a result +DC appears on the line 374-1 that couples with the motor 378 terminal. The other motor terminal finds ground via the circuit breaker 376, line 374-2 and the normally closed contacts WB,BC of switch 372-2, whereby the contact BC is grounded. As a result, the doors are "unlocked" when the proper entry code 3712 is entered.

If any code other than the proper entry code is entered via the keyboard 352, it is recognized by the false entry decoder and driver 360 as "invalid". If a random code such as 7249 (or any one of possibly 9997 other invalid numerical sequences) is entered in this example, the relay coil 362-1 is energized, closing NO relay contacts 362-2 and coupling the +DC power on line 4-1 with line 364 and the contact AC of the switch 22-1'. Contact BC of the switch 22-2 is grounded. The result is that DC power appears between lines 24-1,24-2 that drives the window regulator motor 28 to produce immediate window closure. Two advantages are obtained by this arrangement. If the driver exits the vehicle and forgets to close all of the windows, window roll-up may be obtained merely by entering any code other than the selected entry code into the keyboard 360. Furthermore, if vandals or unauthorized persons tamper with the keyboard 352 in an attempt to gain vehicle entry, entry of any code other than the proper code immediately seals all of the vehicle windows which might have been left open for ventilation.

I anticipate that some advantage may be had by establishing the false entry decoder 360 to have the capability for recognizing an alternate valid code, for example 4801 that interprets into immediate drive of the relay coil 362-1 and immediate window roll-up, while any random entry of any of a possible 9996 other entries may require two or more attempts before window roll-up occurs. This "delay" in recognizing of randomly entered invalid codes prevents premature window roll-up due to mere accidental invalid code entry by a child or otherwise.

Another form of keyless entry system is depicted in FIG. 10 which includes a receiving device 390 and a portable sending device 400 which are ordinarily coupled with each other utilizing a wireless technology, such as infra-red emissions or radio waves. It is better to understand portions of this illustrative arrangement by referral to the discussion relating to FIG. 9 whereby like-numbered elements operate in a similar manner.

The remote control device is of common construction as frequently used for remote door-lock control and for this purpose it includes at least a UNLOCK button switch on a small keypad 402. In addition to the usual UNLOCK button, a unique CLOSE WINDOW button is also provided. The keypad 402 couples with an encoder 404 and a transmitter 406 that sends an encoded wireless signal from an emitter device, such as an antenna 408 or an optical source such as a light emitting diode (LED) or laser diode.

A receptor 393 picks-up the wireless signal and couples therefrom with a receiver 392 that amplifies and recovers the encoded signal produced by the encoder 404. The receiver output couples with a signal processor 394 that efficiently separates the valid signal information from residual noise which might be picked up by the receptor 393.

The processor output couples with an UNLOCK decoder and driver 396 that drives the relay coil 358-1 and closes the relay contacts 358-2 whenever the UNLOCK button is depressed on the keypad 402. As a result, the door is remotely unlocked.

The processor output also couples with a WINDOW CLOSURE decoder and driver 398 that drives the relay coil 362-1 and closes the relay contacts 362-1 whenever the CLOSE WINDOW button is depressed on the keypad 402. As a result, any inadvertently left-open windows are automatically closed.

It shall be realized that the remote control device 400 may include a LOCK function whereby a LOCK button also appears on the keypad 402 and a third encoded LOCK signal is sent from the remote to the vehicle whereupon it may be decoded and serve to LOCK the vehicle's doors. Since this is well known prior art practice it is not particularly depicted here, but is understood to be readily includable as a remote control function.

In my FIG. 11 I show the use of a (usually handheld) portable remote control sender 420 that includes, in this illustrative example, a two-key keypad 424 including an UNLOCK button 423-1 and a LOCK button 423-2 which couple with an encoder 422. When the button 423-1 is pressed down (usually by the operator's finger) an encoded signal is produced that couples with the transmitter 426 that may drive a light emitting diode (LED) 428 or a laser diode. As is well known in the art, the modulated light emissions produced by the diode 428 may be intercepted by a phototransistor 432 or photodiode and a receiver 434 whereupon the signal is amplified and fed to a signal processor 436 that sorts the true signal out from the noise and trash signals which may ordinarily be picked up by the photoreceptor 432. The cleaned-up signal delivered by the processor 436 couples with each of three decoders 438-1,438-2,438-3. The occurence of an UNLOCK signal as initiated by depression of the UNLOCK button 423-1 is recognized by the UNLOCK SIGNAL DECODER 438-1 which drives a relay 440 coil K9 including contacts 441-1,441-2 which are activated so as to energize the door lock drive motor 378 to produce door lock-up. In a similar way, when the UNLOCK button 423-2 is pressed PART WAY down, the encoder 422 produces an encoded LOCK signal that couples via the WIRELESS COUPLING sending and receiving elements 428,432 with the receiver 434 and processor 436 whereupon the processor output is recognized by the LOCK SIGNAL DECODER 438-2 to energize the relay 442 coil K10 including switching of the relay contacts 443-1,443-2 to drive the motor 378 so as to produce vehicle lockup.

It shall be noted that in this illustrative application, I have embodied the LOCK button switch 423-2 to have two functions. This is accomplished by enabling the switch button to be depressed by a "first step" including a first level of (spring-loaded) resistance whereupon the lockup signal is produced. The switch button may then be further depressed by a second step including an increased second level of (spring-loaded) resistance which actuates further switching action which may enable the encoder 422 to produce an encoded WINDOW CLOSURE signal which is sent via wireless coupling to the receiver 434 and ultimately the received WINDOW CLOSE signal accepted by the WINDOW CLOSURE signal decoder 438-3 that drives the coil K8 of a relay 444 including contacts 445-1. The result of the closure of the contacts 445-1 is that the time delay relay 222 is energized and operation might follow along the lines of the description associated with FIG. 5 and FIG. 6, with the result that the windows of the vehicle may become fully closed even after the operator exits from the vehicle. It is anticipated that the convenient "two step" lock button action just described might just as well be provided by having a separate LOCK button and CLOSE WINDOW button. It is also anticipated that by use of either the "two step" LOCK button arrangement or else two separate buttons to obtain the LOCK and WINDOW CLOSE function may negate the necessity for or desirability of the time delay afforded by the timer 222 and as a result it is reasonable that an artisan might merely substitute the contacts 445-1 in the same connection as the contacts 224-2 with the result that a WINDOW CLOSURE signal recognized by the decoder 438-3 may produce immediate and uncontyed window closure when the remote control produces a wireless WINDOW CLOSE signal.

Although I teach several forms for my invention as depicted in the accompanying figures and description, this by no means shall be construed as limiting the scope of my invention to these particular combination of elements or structural configurations. It is the utter essence of my invention to teach a electric window regulator control method and to give example of apparatus suitable for embodiment of the electric window regulator control method which might be suitable for enabling a motor vehicle operator to close any inadvertently left-open windows after ignition turn-off and key withdrawal or even subsequent to exiting from the vehicle. It is necessary to realize that the window regulator and associated lock-up override apparatus might take other forms which can be engineered to suit a particular application or take advantage of specific technological parts or techniques without departing from the underlying spirit of my invention. It is also necessary that, when I give example of specific operating conditions for the representative operation of circuitry associated with my apparatus or when I call for particular components or operating values, it shall be clearly realized that these definitions are merely to serve as guidelines which may help serve to explain the art which I have developed to others. These guidelines should not be construed as limiting or regulatory regarding the operative essence of my invention. At most, they should be understood as being illustrative examples which I have found suitable in several forms of my invention.

It shall be understood that whatever choice of components, component values, power sources, circ. it connections, physical embodiment, vehicle types, window regulator controls, door lock controls, access code formats or other matters of style or technique shall be construed as mere engineering choices or options utilized to satisfy a specific application for my invention and such choices shall be considered fully within the scope of my claimed invention.

What I claim is:

1. An accessory control method extending at least temporary electric window regulator operability in a motor vehicle for a limited extent of time immediately following ignition system switch lockup and usual accessory electrical system disablement, comprising steps of:
    initiating an onset of an elapse of the limited extent of time in immediate response to the ignition system switch lockup;
    deferring disablement of a portion of the accessory electrical system which determines said electric window regulator operability for the limited extent of time;
    thereby maintaining operability of at least a driver or operator accessible set of electric window regulator controls for the limited extent of time and enabling an inadvertently left-open window to be conveniently closed by the operator of the motor vehicle without a necessitous unlocking of the ignition system switch.

2. The accessory control method of claim 1 wherein the motor vehicle may include an electric door lock system and comprise further steps of:
    enabling the electric door lock system to LOCK and UNLOCK utilizing an operator controlled and momentarily activated selectable mode door-lock switch having at least LOCK and UNLOCK finger activated actuator buttons;
    staging at least one of the door lock switch said LOCK and UNLOCK said actuator buttons to express at least two levels of operation;
    incrementing the staged said actuator button to a first level which is partially depressed, and
    incrementing the staged said actuator button to a second level which is fully depressed;
    whereby, the first level of the staged said actuator button depression enables actuation of the electric door lock system, and the second level of the staged said actuator button depression determines said electric window regulator operability for the limited extent of time and enables at least one-way said window regulator operability by the operator.

3. The accessory control method of claim 1 wherein the motor vehicle may include an electric door lock system and comprise further steps of:
    sensing window position set by the electric window regulator; and,
    disabling electric lock-up of at least a driver position said electric door lock system whenever the set window position is sensed to be other than about closed.

4. The accessory control method of claim 1 wherein the motor vehicle may include an electric door lock system and comprise further steps of:
    enabling the electric door lock system to LOCK and UNLOCK utilizing an operator controlled and momentarily activated selectable mode door-lock switch having at least LOCK and UNLOCK finger activated actuator buttons;

maintaining the door-lock switch in the LOCK position for a prolonged period of time; and, enabling the electric window regulator operation to produce automatic window closure when the prolonged period of time during which the door-lock switch is said maintained in the LOCK position exceeds a predetermined interval of time.

5. The accessory control method of claim 1 wherein the motor vehicle may include a remote keyless electric door lock system and comprise further steps of:

sending a first encoded signal enabled by a finger selected first actuator switch activated in a LOCK mode for a first time interval of usually brief duration, whereby said first actuator switch is included as a portion of a portable remote control transmitter;

receiving the first encoded signal and enabling the keyless electric door lock system to LOCK otherwise unlocked doors of the motor vehicle;

said sending an extended duration said first encoded signal enabled by a prolonged activation of the finger selected said LOCK position activation of the first actuator switch for a second time interval; and, determining received duration of the encoded signal as said extended duration thereby temporarily enabling the electric window regulator operation to produce window closure of any inadvertently left-open windows in the motor vehicle.

6. The accessory control method of claim 1 wherein the motor vehicle may include an electric door lock system and comprise further steps of:

inserting a key into a tumbler portion of an exterior lockset device ordinarily utilized for manual door lock-up subsequent to an operator's exit from the motor vehicle, maintaining the key and the tumbler in a designated relational position for a prolonged period of time; and, enabling the electric window regulator operation to produce at least a window closure when the prolonged period of time exceeds a predetermined time interval of several seconds duration.

7. An electric window control method for at least temporarily enabling a predetermined extent of electric window regulator operation subsequent to ignition system lock-up and a disablement of a substantial portion of a motor vehicle's accessory electrical circuits and therefor comprising steps of: locking-up the motor vehicle's said ignition system;

predetermining elapse of a first period of time initiated by onset of and running concurrent with the ignition system's said lockup;

maintaining operability of portions of the accessory electrical circuits including the electric window regulator and at least an operator accessible set of electric window regulator controls during the predetermined said first period of time;

disabling the electric window regulator operability subsequent to elapse of the first period of time.

8. The electric window control method of claim 7 comprising a further step of limiting service of the electric window regulator said maintained operability to a window closure mode.

9. The electric window control method of claim 8 which, during a period of said maintained operability of the accessory electrical circuits, comprises further steps of:

attaining a full closure of the motor vehicle's windows; and, opening at least one of the fully closed windows to a limited extent preferably less than about one inch, thereby permitting partial ventilation of the motor vehicle.

10. The electric window control method of claim 7 comprising a further step of:

predetermining the electric window regulator to include an automatic closure mode which immediately closes otherwise inadvertently left-open windows of the motor vehicle during the first period of time.

11. The electric window control method of claim 7 which, during a period of said maintained operability of the accessory electrical circuits and subsequent to an operator's exiting from and locking the motor vehicle's access door, comprises further steps of:

inserting a key fitting the motor vehicle into a keyhole comprising a tumbler portion of a lockset device utilized for the locking of the access door;

maintaining the key and the tumbler in a predetermined position for at least a second period of time of less time duration than the first period of time; and, enabling the electric window regulator to produce at least closure control of inadvertently left-open windows following an elapse of the second period of time.

12. The electric window control method of claim 7 which includes a keyless entry system which ordinarily accepts entry of a first predetermined code to ordinarily enable UNLOCKING of the door means whereupon following an operator's exiting from and locking the motor vehicle's access door, comprises further steps of:

accepting at least one of a second predetermined code and an invalid code that may be entered into the keyless entry system;

enabling automatic closure of each inadvertently left-open window in response to said at least one of the second predetermined code and the invalid code.

13. The electric window control method of claim 7 wherein the motor vehicle includes an electric door locking system including a remote keyless entry system and comprising further steps of:

sending one of a least a first function and a second function encoded control signal using a portable wireless transmitter device; receiving the encoded control signal;

differentiating function level of the received said encoded control signal;

setting the electric door locking system to one of at least a LOCK and UNLOCK state in response to the differentiated said first function said encoded control signal;

operating the electric window regulator in a closure mode in response to the differentiated said second function said encoded control signal;

whereby inadvertently left-open windows may be closed subsequent to the operator's exit from and lockup securing of the motor vehicle.

14. An electric window control means for maintaining operability of a motor vehicle's electric window regulator control means for a first predetermined period of time immediately following an onset of ignition switch means lock-up and a disablement of the motor vehicle's accessory electrical circuit means, comprising:

a first timing means for metering the first predetermined period of time commencing with the onset of the ignition switch means said lock-up; and, a post-lockup accessory circuit overriding means for maintaining an extended period of operability of at least the electric window regulator control means portion of the post-lockup disabled said accessory electrical circuit means for a duration of time concurrent with the metered said first predetermined period of time;

whereby during the first predetermined period of time at least a driver or operator accessible said electric window regulator control means remain substantive operative to enable at least a closure of the motor vehicle's inadvertently left-open windows.

15. The electric window control means of claim 14 further comprising:

an electric door lock means; and, a staged door lock switch means having a first position which is ordinarily engaged by ordinary actuation and a second position which is engaged by exceptional actuation and an intentional operator effort;

whereby, the first position ordinarily couples with the electric door lock means to enable door lock-up control, and the second position ordinarily couples with the electric window regulator means to enable at least a closure of a left-open window.

16. The electric window control means of claim 14 further comprising:

an electric door lock means;

an electric door lock control switch means; and, a window operator switch means for the electric window regulator means;

whereby, simultaneous operation of the electric door control switch means and the window operator switch enables the extended operability of the window regulator means subsequent to the lockup of the ignition switch means.

17. The electric window control means of claim 14 including a remote keyless entry system comprising:

a portable wireless transmitter means including a manually operated switch means enabling the operator to select a first switch action enabling wireless transmission of at least a first function identifying encoded control signal and wherein the selected first switch action may establish a first time duration for enabling a first level said first function identifying encoded control signal, and establish an extended second time duration for enabling a second level said first function identifying encoded control signal;

an encoded control signal receiver mean portion of the motor vehicle;

a second timing means for metering a second predetermined period of time;

a first decoder means for differentiating the first level functional sense of the received said encoded control signal having a time duration less than the second predetermined period of time;

a second decoder means for differentiating a second level functional sense of the received said encoded control signal having a time duration exceeding the second predetermined period of time;

whereby, the reception of the first level functional sense said encoded control signal may LOCK the door means and the reception of the second level functional sense said encoded control signal may enable closure of any inadvertently left-open windows.

18. The electric window control means of claim 14 further comprising:

a key operated door lockset means;

a lockset switch means mechanically actuated by the key operation of the door lockset means;

a second timing means for metering elapse of a second predetermined period of time initiated by the actuation of the lockset switch means;

an activator means responsive to a maintained state of said key operation to thereby produce a closure of a left-open window upon completion of the metered elapse of the second predetermined period of time;

whereby, the maintained state of said key operation enables the driver or operator to determine at least a closure of a left-open window subsequent to the lock-up of the ignition switch means and usually after driver or operator egress from the motor vehicle.

19. The electric window control means of claim 14 further comprising:

a keyless entry means including keycode switch entry means for enabling an UNLOCKING of the door means in response to an entry of a first predetermined keycode into the keycode switch entry means; and, a keyless entry security means for accepting an entry of at least one of a second value predetermined keycode and an invalid keycode value and thereupon to enable an automatic closure of any inadvertently left-open windows.

20. The electric window control means of claim 14 including a remote keyless entry system comprising:

a portable wireless transmitter means including a manually operated switch means enabling the operator to a select wireless transmission of at least a first function identifying and a second function identifying encoded control signal;

an encoded control signal receiver means portion of the motor vehicle;

a decoder means for differentiating a functional sense of the received said encoded control signal;

whereby the reception of the said first function identifying encoded control signal may LOCK the door means and the reception of the second said identifying function encoded control signal may enable closure of any inadvertently left-open windows.

* * * * *